United States Patent [19]
Vanden Eynde et al.

[11] 3,867,451
[45] Feb. 18, 1975

[54] FLUORO-ALKYLHYDRAZINES

[75] Inventors: Hector Alfons Vanden Eynde, Mortsel-Antwerpen; Robert Joseph Pollet, Berchem-Antwerpen; Arthur Henri De Cat, Mortsel-Antwerpen, all of Belgium

[73] Assignee: Agfa-Gevaert, N.V., Mortsel, Belgium

[22] Filed: July 12, 1965

[21] Appl. No.: 471,437

[30] Foreign Application Priority Data
July 24, 1964 Great Britain.................... 29739/64

[52] U.S. Cl.................. 260/569, 96/55, 260/456 R, 260/456 P, 260/618 P, 260/633
[51] Int. Cl.............C07c 109/02, C07c 109/04, G03c 7/100
[58] Field of Search.......................... 260/569, 583 B

[56] References Cited
UNITED STATES PATENTS
3,105,849  10/1963  Huebner........................ 260/596 X
3,211,791  10/1965  Druey et al........................ 260/569

*Primary Examiner*—Floyd D. Higel
*Attorney, Agent, or Firm*—A. W. Breiner

[57] ABSTRACT

Fluoro-alkyl hydrazine compounds corresponding to the formula:

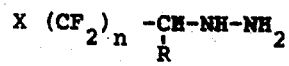

where X is a hydrogen atom or a fluorine atom, R is hydrogen alkyl or aryl and *n* is a positive integer of from 1 to 25, and their method of preparation is described. The compounds are useful in preparing 1-fluoroalkyl-2-pyrazoline-5-one color couplers.

6 Claims, No Drawings

FLUORO-ALKYLHYDRAZINES

The present invention relates to new fluoro-alkylhydrazines and a process for the preparation thereof.

More particularly the present invention relates to a process for preparing fluoro-alkylhydrazine compounds corresponding to the following general formula:

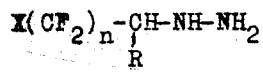

wherein:
X is a hydrogen atom or a fluorine atom
R is a hydrogen atom, an alkyl- or aryl radical which radicals may be further substituted, and
$n$ represents a positive integer from 1 to 25 inclusive.

The following reaction scheme illustrates the preparation of said hydrazines:

(a) 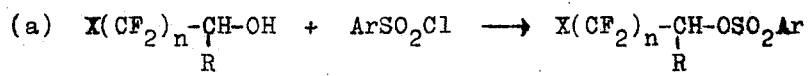

(b) 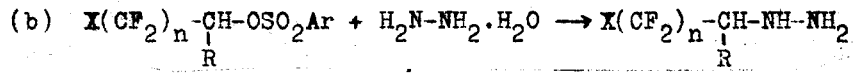

wherein:
Ar is an aryl radical e.g., a phenyl radical, and
X, R and $n$ have the same significance as given above.

The aromatic sulphonic acid ester of a fluoroalkyl alcohol is obtained by condensation of an aryl sulphonyl chloride with a fluoroalkyl alcohol in an appropriate solvent such as pyridine.

As alcohols may be used e.g., the fluoroalkylalcohols mentioned in Aliphatic Fluorine Compounds by Allan. M. Lovelace, William Postelnek and Douglas A. Rausch, Reinhold Publishing Company New York Table 7, p. 145-150 more particularly
2,2,2-trifluoroethanol
1H, 1H, 3H-tetrafluoro-1-propanol
1H, 1H, 5H-octafluoro-1-pentanol
1H, 1H, 7H-dodecafluoro-1-heptanol
1H, 1H, 9H-hexadecafluoro-1-nonanol
1H, 1H, 11H-eicosafluoro-1-undecanol
3,3,4,4-tetrafluoro-butanol-2
3,3,4,4,5,5,6,6-octafluoro-hexanol-2
3,3,4,4,5,5,6,6,7,7,8,8-dodecafluoro-octanol-2 and
α-trifluoromethylbenzyl alcohol.

The condensation is preferably carried out below room temperature. However, depending on the structure of the reagents, the reaction may be carried out at room temperature.

The aromatic sulphonic acid ester is usually separated by pouring the reaction mixture into water. The ester is obtained either in the form of a solid product which is collected by filtering off or in the form of a liquid which is extracted by means of a solvent whereupon the solvent is evaporated. The solid ester products can be purified by recrystallization, whereas the liquid ester products are purified by fractional distillation.

In order to obtain the hydrazine compounds according to the invention the aromatic sulphonic acid ester of a fluoroalkyl alcohol is reacted with hydrazine or a hydrazine yielding compound e.g., hydrazine hydrate or with an acyl derivative of hydrazine such as acetyl hydrazine, the acyl group of which can be split off after condensation by saponification. The condensation is occasionally carried out in the presence of a suitable solvent e.g., ethyleneglycolomonomethylether but preferably in the absence of a solvent.

Hydrazine hydrate is preferably used in excess, e.g., a ten fold of the required molar amount gives a high yield of fluoroalkyl hydrazines.

The reaction of the aromatic sulphonic acid ester of a fluoroalkyl alcohol with hydrazine hydrate takes place preferably at the reflux temperature of the reaction mixture.

For making the reaction proceed at reflux temperature either a short initial heating suffices or otherwise the reaction mixture must be heated for the whole reaction-time depending on the nature of the reagents. The reaction time of course is determined by the nature of the reagents and varies from 2 to 50 hours.

At the end of the reaction, the mixture is cooled and the hydrazine formed is separated by extraction with an appropriate solvent e.g., diethyl ether. Purification may occur by fractional distillation.

Acid addition salts of the perfluoro-alkylhydrazines are produced by reacting the hydrazines with a suitable acid, e.g., a mineral acid like hydrochloric acid, in an appropriate solvent.

The fluoro-alkyl hydrazines according to the present invention are important starting materials for the synthesis of several organic compounds such as 1-fluoroalkyl-2-pyrazoline-5-one colour couplers, which form magenta azomethine dyes on colour development of exposed light-sensitive silver halide materials with aromatic primary amines.

The following description illustrates the preparation of some fluoro-alkylhydrazines according to the present invention without, however, limiting the invention thereto.

PREPARATION 1 a. 2,2,2-trifluoroethyl benzene sulphonate

In a reaction vessel fitted with stirrer, thermometer, dropping funnel and drying tube 2,265 cm3 of anhydrous pyridine are cooled to 5°C whereupon 906 g of 2,2,2-trifluoroethanol are dropwise added in such a way that the temperature does not rise above 10°C. Then, 1,620 g of benzene sulphonyl chloride are dropwise added while keeping the temperature between 5 and 10°C. When all benzene sulphonyl chloride is added, stirring is continued for another 30 min. at 5°-10°C whereupon the reaction mixture is allowed to stand overnight at room temperature. When poured into water, two liquid layers are formed. The supernatant aqueous layer is extracted twice with diethyl ether. The ether extracts are added to the other liquid layer and the solution is dried over magnesium sulphate. After having evaporated the ether, the residue is vacuum distilled with the help of a Vigreux column of 40 cm. The fraction boiling at 74°-80°C/0.4 mm Hg is collected.

b. 2,2,2-trifluoroethylhydrazine

In a reaction vessel fitted with stirrer and reflux condenser, 1,800 g of 2,2,2-trifluoroethylbenzene sulphonate and 3,750 g of hydrazine hydrate (content : min. 98 percent) are refluxed. A solution is formed gradually and the reaction is sufficiently exothermic at boiling temperature in order to keep the reaction mixture refluxing for quite some time without need of heating. After having been refluxing for 2½ hours, the reaction mixture is extracted continuously for 7½ hours with diethyl ether whereupon the ether solution is dried over magnesium sulphate and the ether is evaporated. The residue is distilled in a fractional distillation assembly supplied by the Todd Scientic Company, Springfield, Pa., U.S.A. The fraction boiling at 101°–107°C/760 mm Hg is collected.

2,2,2-trifluoroethylhydrazine hydrochloride.

The hydrazine dissolved in ether, was neutralized with ethanolic hydrochloric acid, the precipitate collected by filtration and washed with ether. Sublimation at about 230°C.

PREPARATION 2 a. 2,2,3,3,4,4,5,5-octafluoro pentyl benzene sulphonate

This compound is prepared analogously to the compound of preparation (1.a) from 749 g of 2,2,3,3,4,4,5,5-octafluoropentanol, 810 cm3 of anhydrous pyridine and 570 g of benzene sulphonyl chloride. After vacuum distillation by means of a Todd fractional distillation assembly a colourless liquid is obtained boiling at 103°–105°C/0.3 mm Hg.

b. 2,2,3,3,4,4,5,5-octafluoropentyl hydrazine

In a reaction vessel fitted with a stirrer and a refllux condenser 1,116 g of 2,2,3,3,4,4,5,5-octafluoropentyl-benzene sulphonate and 1,500 g of hydrazine hydrate (content : min. 98 percent) are refluxed for 48 hours. In the brown mixture two liquid layers are formed on cooling, the supernatent layer of which is extracted three times with diethyl ether. The ether extracts are added to the other layer and the whole is dried over magnesium sulphate. After having evaporated the ether, the residue is vacuum distilled with the aid of a Vigreux column of 40 cm and a water-jet vacuum pump. The fraction boiling at 68.5°–70.5°C/10 mm Hg is collected.

2,2,3,3,4,4,5,5-octafluoropentyl hydrazine hydrochloride

The hydrazine was neutralized with ethereal hydrochloric acid and the hydrochloride precipitated with n-hexane. After filtration, the hydrochloride was washed with isopropyl ether. Sublimation at about 250°C.

PREPARATION 3 a. ω-trifluoro acetophenone

This compound is prepared analogously to the method described in J. Chem. Soc. 1956, 838–9 b. 1-phenyl-2,2,2-trifluoro-ethanol

This compound is prepared by reduction of ω-trifluoroacetophenone with potassium borohydride analogously to the method described by A. Vogel "A textbook of Practical Organic Chemistry" p. 881, 3rd Ed. 1956 Longmans, Green and Co., Ltd. London W.I., England.

A colourless liquid boiling at 80.5°C/10 mm Hg is obtained.

c. (α-trifluoromethyl benzyl) benzene sulphonate

In a reaction vessel fitted with stirrer, thermometer, dropping funnel and drying tube are placed 275 cm3 of anhydrous pyridine whereupon 193.3 g of 1-phenyl-2,2,2-trifluoro-ethanol are added while cooling with ice so that the temperature does not rise above 30°C. Then, 193.5 g of benzene sulphonyl chloride is dropwise added, the temperature being kept between 25° and 30°C. When the whole amount has been added, the mixture is stirred for 1 hour at room temperature whereupon the reaction mixture is allowed to stand overnight. The next day the mixture is poured into 1,800 cm3 of water and the white precipitate is washed with water. Melting point : 89°C.

d. (α-trifluoromethyl benzyl) hydrazine 31.6 g of the above benzene sulphonate is suspended in 50 g of hydrazine (content : min. 98 percent) by means of a stirrer whereupon the mixture is refluxed for 6 hours. After having been cooled, the reaction mixture is extracted three times with diethyl ether whereupon the layers are dried over magnesium sulphate. After having evaporated the ether, the residue is vacuum distilled using a Vigreux column of 30 cm high and a water-jet vacuum pump. The fraction boiling at 105°–107°C/9 mm Hg is collected.

(α-trifluoromethyl benzyl) hydrazine hydrochloride

The hydrazine dissolved in ether, was neutralized with ethanolic hydrochloric acid, the precipitate collected by filtration and washed with ether. Sublimation at about 260°C.

PREPARATION 4 a. (1-methyl-2,2,3,3-tetrafluoro-propyl) benzene sulphonate

This compound is prepared analogously to the compound of preparation 1.a) using 438 g of 1-methyl-2,2,3,3-tetrafluoropropanol, 750 cm3 of anhydrous pyridine and 530 g of benzene sulphonyl chloride.

After vacuum distillation with the aid of a Vigreux column of 40 cm a colourless liquid is obtained boiling at 111°–113°C/1.2 mm Hg.

b. (1-methyl-2,2,3,3-tetrafluoro-propyl)-hydrazine 57.2 g of (1-methyl-2,2,3,3-tetrafluoro-propyl) benzene sulphonate and 100 g of hydrazine hydrate (content : min. 98 percent) are refluxed for 18 hours while stirring. The solution formed is continuously extracted for 6 hours with diethyl ether. The ether solution is dried over magnesium sulphate and then evaporated. The residue is vacuum distilled with the help of a Vigreux column of 30 cm. The fraction boiling at 66°–69°C/19 mm Hg is collected.

(1-methyl-2,2,3,3-tetrafluoro-propyl)-hydrazine hydrochloride

The hydrazine was neutralized with ethereal hydrochloric acid in ether solution, the precipitate collected by filtration and washed with ether. Sublimation at about 220°C.

PREPARATION 5 a. 1H, 1H, 11H-eicosafluoro-1-undecylbenzene sulphonate

This compound is prepared analogously to the compound of preparation (1.a) from 468.5 g of 1H, 1H, 11H-eicosafluoro-1-undecanol, 220 cm3 of anhydrous pyridine and 112.5 g of benzene sulphonyl chloride. After recrystallisation from methanol, a white product is obtained. Melting point : 68°C.

b. 1H, 1H, 11H-eicosafluoro-1-undecyl hydrazine 67.2 g of 1H, 1H, 11H-eicosafluoro-1-undecylbenzene sulphonate and 50 g of hydrazine hydrate (content : min. 98 percent) are stirred and refluxed in 150 cm3 of ethylene glycol monomethyl ether for 24 hours. The mixture is poured into water and extracted three times with diethyl ether. The ether extract is dried over magnesium sulphate and evaporated whereupon the residue is vacuum distilled. The fraction boiling at 99°–101°C/0.55 mm Hg is collected. When cooling said fraction a white solid product separates. Melting point : 95°C.

We claim:

1. A fluoro-alkyl hydrazine corresponding to the following formula:

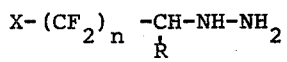

wherein:
X is a member of the group consisting of a hydrogen atom and a fluorine atom,
R is a member of the group consisting of a hydrogen atom, lower alkyl or phenyl, and
$n$ is a positive integer from 1 to 25 inclusive.
2. 2,2,2-trifluoroethyl hydrazine.
3. 2,2,3,3,4,4,5,5-octafluoro pentyl hydrazine.
4. (α-trifluoromethyl benzyl) hydrazine.
5. (1-methyl-2,2,3,3-tetrafluoro-propyl)-hydrazine.
6. 1H, 1H, 11H-eicosafluoro-1-undecyl hydrazine.

* * * * *